United States Patent
Walker et al.

(10) Patent No.: US 8,908,577 B2
(45) Date of Patent: Dec. 9, 2014

(54) SOLVING IP BUFFERING DELAYS IN MOBILE MULTIMEDIA APPLICATIONS WITH TRANSLAYER OPTIMIZATION

(75) Inventors: Gordon Kent Walker, Poway, CA (US); Christopher John Bennett, San Diego, CA (US); An Mei Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 823 days.

(21) Appl. No.: 11/561,299

(22) Filed: Nov. 17, 2006

(65) Prior Publication Data

US 2007/0183350 A1 Aug. 9, 2007

Related U.S. Application Data

(60) Provisional application No. 60/741,973, filed on Dec. 2, 2005.

(51) Int. Cl.
| | |
|---|---|
| *H04B 7/00* | (2006.01) |
| *H04L 29/06* | (2006.01) |
| *H04L 12/801* | (2013.01) |
| *H04L 12/811* | (2013.01) |
| *H04W 28/14* | (2009.01) |

(52) U.S. Cl.
CPC ...... *H04L 29/06027* (2013.01); *H04L 65/4076* (2013.01); *H04L 47/10* (2013.01); *H04L 65/605* (2013.01); *H04L 65/80* (2013.01); *H04W 28/14* (2013.01); *H04L 47/14* (2013.01); *H04L 47/38* (2013.01)
USPC .............................. 370/310; 370/312; 370/331

(58) Field of Classification Search
USPC ......... 370/278, 280, 331, 433, 468, 389, 392, 370/401
See application file for complete search history.

(56) References Cited

U.S. PATENT DOCUMENTS

| | | | |
|---|---|---|---|
| 6,879,581 B1 * | 4/2005 | Leung | 370/352 |
| 2002/0093912 A1 * | 7/2002 | Gummalla et al. | 370/229 |

(Continued)

FOREIGN PATENT DOCUMENTS

| | | |
|---|---|---|
| CN | 1464685 A | 12/2003 |
| CN | 1529501 A | 9/2004 |

(Continued)

OTHER PUBLICATIONS

"Digital Video Broadcasting (DVB); DVB Specification for Data Broadcasting", Nov. 2004, pp. 1-78, ETSI EN 301 192 vol. 1.4.1, European Broadcasting Union—ETSI, Sophia, Antipolis Cedex, France.

(Continued)

*Primary Examiner* — Anez Ebrahim
(74) *Attorney, Agent, or Firm* — Fulbright & Jaworski LLP

(57) ABSTRACT

Systems and methodologies are described that facilitate relocating an IP buffer from a conventional location in a user device handset to a radio-access network (RAN) interface in order to reduce acquisition delay in the user device. By performing IP buffering at the transmission side of a forward link transmission, acquisition time can be reduced by approximately 5-7 seconds. Additionally, a physical layer aware encoder can be employed, which has knowledge of transmission constraints associated with, for example, a conventional DVB-H transmission protocol, and can parse streaming media into 1-second segments that can be pre-packaged in a current superframe for display at a subsequent time.

55 Claims, 9 Drawing Sheets

(56) References Cited

U.S. PATENT DOCUMENTS

| | | | |
|---|---|---|---|
| 2004/0071088 A1 | 4/2004 | Curcio et al. | |
| 2004/0073692 A1 | 4/2004 | Gentle et al. | |
| 2004/0085963 A1* | 5/2004 | Ying | 370/394 |
| 2005/0088959 A1* | 4/2005 | Kadous | 370/208 |
| 2005/0096054 A1 | 5/2005 | Zhang et al. | |
| 2005/0125840 A1 | 6/2005 | Anderson et al. | |
| 2005/0141475 A1* | 6/2005 | Vijayan et al. | 370/345 |
| 2005/0220147 A1* | 10/2005 | Pekonen et al. | 370/486 |
| 2006/0013153 A1 | 1/2006 | Vare et al. | |
| 2006/0115088 A1* | 6/2006 | Valentine et al. | 380/270 |
| 2006/0120378 A1* | 6/2006 | Usuki et al. | 370/395.4 |
| 2007/0002852 A1* | 1/2007 | Pekonen et al. | 370/389 |

FOREIGN PATENT DOCUMENTS

| | | |
|---|---|---|
| CN | 1588987 A | 3/2005 |
| CN | 1640029 A | 7/2005 |
| EP | 1 045 562 A2 | 10/2000 |
| WO | WO 03/075494 A1 | 9/2003 |
| WO | WO 2005/043783 A1 | 5/2005 |

OTHER PUBLICATIONS

"Digital Video Broadcasting (DVB); DVB-H Implementation Guidelines", Nov. 2005, pp. 1-104, ETSI TR 102 377 vol. 1.2.1, European Broadcasting Union,—ETSI, Sophia, Antipolis Cedex, France.

International Search Report—PCT/US2006/061527, International Search Authority, Nov. 5, 2007, European Patent Office, Rijswijk.

Van Der Schaar, et al., "Cross-Layer Wireless Multimedia Transmission: Challenges, Principles, and New Paradigms", Advances in Wireless Video, Aug. 2005, pp. 50-58, vol. 12, No. 4, IEEE Wireless Communications.

Search Report—ROC (Taiwan) Patent Application No. 095144863, Dec. 3, 2010, Taiwan.

* cited by examiner

SOLVING IP BUFFERING DELAYS IN MOBILE MULTIMEDIA APPLICATIONS WITH TRANSLAYER OPTIMIZATION

CLAIM OF PRIORITY UNDER 35 U.S.C. §119

The present Application for Patent claims priority to Provisional Application No. 60/741,973 entitled "SOLVING IP BUFFERING DELAYS IN MOBILE MULTIMEDIA APPLICATIONS WITH TRANSLAYER OPTIMIZATION" Dec. 2, 2005, and assigned to the assignee hereof and hereby expressly incorporated by reference herein.

BACKGROUND

I. Field

The following description relates generally to wireless communications, and more particularly to facilitating reducing acquisition time by a handheld device in a wireless communication environment.

II. Background

Wireless communications systems have become a prevalent means by which a majority of people worldwide have come to communicate. Wireless communication devices have become smaller and more powerful in order to meet consumer needs and to improve portability and convenience. The increase in processing power in mobile devices such as cellular telephones has lead to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

More particularly, frequency division based techniques typically separate the spectrum into distinct channels by splitting it into uniform chunks of bandwidth, for example, division of the frequency band allocated for wireless communication can be split into 30 channels, each of which can carry a voice conversation or, with digital service, carry digital data. Each channel can be assigned to only one user at a time. One known variant is an orthogonal frequency division technique that effectively partitions the overall system bandwidth into multiple orthogonal subbands. These subbands are also referred to as tones, carriers, subcarriers, bins, and/or frequency channels. Each subband is associated with a subcarrier that can be modulated with data. With time division based techniques, a band is split time-wise into sequential time slices or time slots. Each user of a channel is provided with a time slice for transmitting and receiving information in a round-robin manner. For example, at any given time t, a user is provided access to the channel for a short burst. Then, access switches to another user who is provided with a short burst of time for transmitting and receiving information. The cycle of "taking turns" continues, and eventually reach user is provided with multiple transmission and reception bursts.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user' stream of bits is encoded and spread across a very wide channel in a pseudo-random fashion. The receiver is designed to recognize the associated unique sequence code and undo the randomization in order to collect the bits for a particular user in a coherent manner.

A typical wireless communication network (e.g., employing frequency, time, and code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams carried by the composite stream. Likewise, a mobile terminal can transmit data to the base station or another mobile terminal. Such communication between base station and mobile terminal or between mobile terminals can be degraded due to channel variations and/or interference power variations.

Media distribution systems comprise various service types, including but not limited to: real time; non-real time; and IP Datacast ("IPDC") service types; and combinations thereof. A real time service normally delivers content within a specific second and a typically selected for immediate consumption, delivering streaming video audio and text. For example, a real time service may provide a live broadcast of a sporting event or a live performance. IP Datacast is a form of real time service that delivers an IP multicast data stream to a specific address within seconds and is primarily aimed at handset data applications including stock, weather, traffic, and emergency services. A non-real time service, i.e. "Clipcast" media, is normally scheduled over minutes and is typically stored for later presentation or viewing. For example, non real time service may provide pre-recorded content, such as an advertisement, information on a presentation, etc., which is saved in memory on a media-capable device and later recalled for viewing. Non-real time media is not limited to non-real time services. Non-real time media may be a component of both real-time and non-real time services. Additionally, some services may provide some combination of real-time media and non-real-time services, such as displaying player information during a live broadcast of a sporting event in which the player is participating. Because non-real time media is normally downloaded to a device for later viewing, the implementation of non-real time media delivery may benefit from memory management on the suer device to minimize the loss of data due to insufficient memory at the time of media delivery.

Conventional Internet protocol (IP) streaming media services utilize an IP buffer located in a handset receiving a signal. However, channel acquisition can include a plurality of delays, which can comprise an IP buffer delay. Therefore, a need exists in the art for systems and methods that facilitate mitigating delays associated with an IP buffer in order to improve system throughput and enhance user experience.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with relocating an IP buffer from a handset, as is conventional according to DVB-H standards, to a radio-access network (RAN) interface and packing the fixed burst size of a DVB-H layer to have substantially precisely an amount of data necessary for display in a next or subsequent N seconds, while omitting unnecessary data. The RAN interface can comprise an encoder that is aware of package settings associated with the DVB-H physical layer, and which forms IP packets to fill an allocated burst size precisely. This, in turn, permits quality-of-service (QoS) constraints to be relaxed while permitting rapid acquisition given specific physical layer restrictions.

According to another aspect, a method of reducing acquisition time for streaming media in a wireless communication environment can comprise employing an IP buffer in a radio access network (RAN) interface to buffer streaming media data prior to transmission and encoding IP packets utilizing a variable data rate and a fixed or variable delivery time within a specified time window. The method can further comprise pre-packing a first superframe with a predefined amount of media data intended for display at a subsequent fixed or predefined delivery time, and the fixed delivery time can be approximately one second. The method may still further comprise encoding the IP packets according to predefined transmission constraints and transmitting the buffered steaming media data using a DVB-H protocol. For instance, one display second of buffered streaming media data can be transmitted each second in bursts approximately 250 ms apart.

According to another aspect, an apparatus that facilitates reducing acquisition delay in a wireless communication environment can comprise an IP buffer in a RAN interface which buffers streaming media data prior to transmission to a user device, and a physical-layer aware (hereinafter "phy-aware") encoder that has knowledge of package settings related to a DVB-H physical layer and pre-packages time slices with data intended for display during a subsequent time period. The phy-aware encoder fills an Nth time slice with data intended for an N+Mth display period, and the time slice and the display period have a duration of approximately one second. The apparatus can additionally comprise a transmitter that transmits a time slice every second in four transmission bursts spaced approximately 250 ms apart.

Yet another aspect relates to a wireless communication apparatus, comprising means for performing internet protocol (IP) buffering of data prior to transmission, means for encoding buffered media data with knowledge of a physical layer with which the data is to be transmitted, and means for transmitting the encoded media data. The means for transmitting may transmit approximately one superframe of data per second and may do so at approximately one superframe of data per second at a variable data rate. Moreover, the means for transmitting may transmit the approximately one superframe of data as a plurality of data bursts, substantially equally spaced in time, such as, for instance four data bursts approximately 250 ms apart in time. The wireless communication apparatus may employ a DVB-H protocol in conjunction with various aspects. The means for encoding may encode an Nth superframe with data for display during an N+Mth time period, where N and M are integers, wherein the superframe and display period respectively have a duration of approximately one second.

A further aspect relates to a computer-readable medium having stored thereon computer-executable instructions for buffering data according to an internet protocol (IP) prior to transmission, encoding buffered media data in accordance with constraints associated with a physical layer upon which the data is to be transmitted, and transmitting the encoded media data. The instructions may further comprise transmitting approximately one superframe of data per second, transmitting the approximately one superframe of data per second at a variable data rate, and/or transmitting the approximately one superframe of data as a plurality of data bursts, substantially equally spaced in time. For example, the approximately one superframe may be transmitted as four data bursts approximately 250ms apart in time. The computer-readable medium may further comprise instructions for encoding an Nth superframe with data for display during an N+Mth time period, where N and M are integers, wherein the superframe and display period respectively have a duration of approximately one second.

Yet another aspect relates to a processor that executes instructions for increasing throughput in a wireless communication environment, the instructions comprising pre-buffering data according to an internet protocol (IP) prior to transmission, encoding buffered media data according to predefined constraints associated with a physical layer upon which the data is to be transmitted, and transmitting the encoded media data on the physical layer. The instructions may further comprise transmitting approximately one superframe of data per second, transmitting the approximately one superframe of data per second at a variable data rate, and/or transmitting the approximately one superframe of data as a plurality of data bursts, substantially equally spaced in time, such as four data bursts approximately 250 ms apart in time. The processor may further execute instructions for utilizing a DVB-H protocol to transmit the data. Additionally, the instructions may comprise encoding an Nth superframe with data for display during an N+Mth time period, where N and M are integers, wherein the superframe and display period respectively have a duration of approximately one second.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
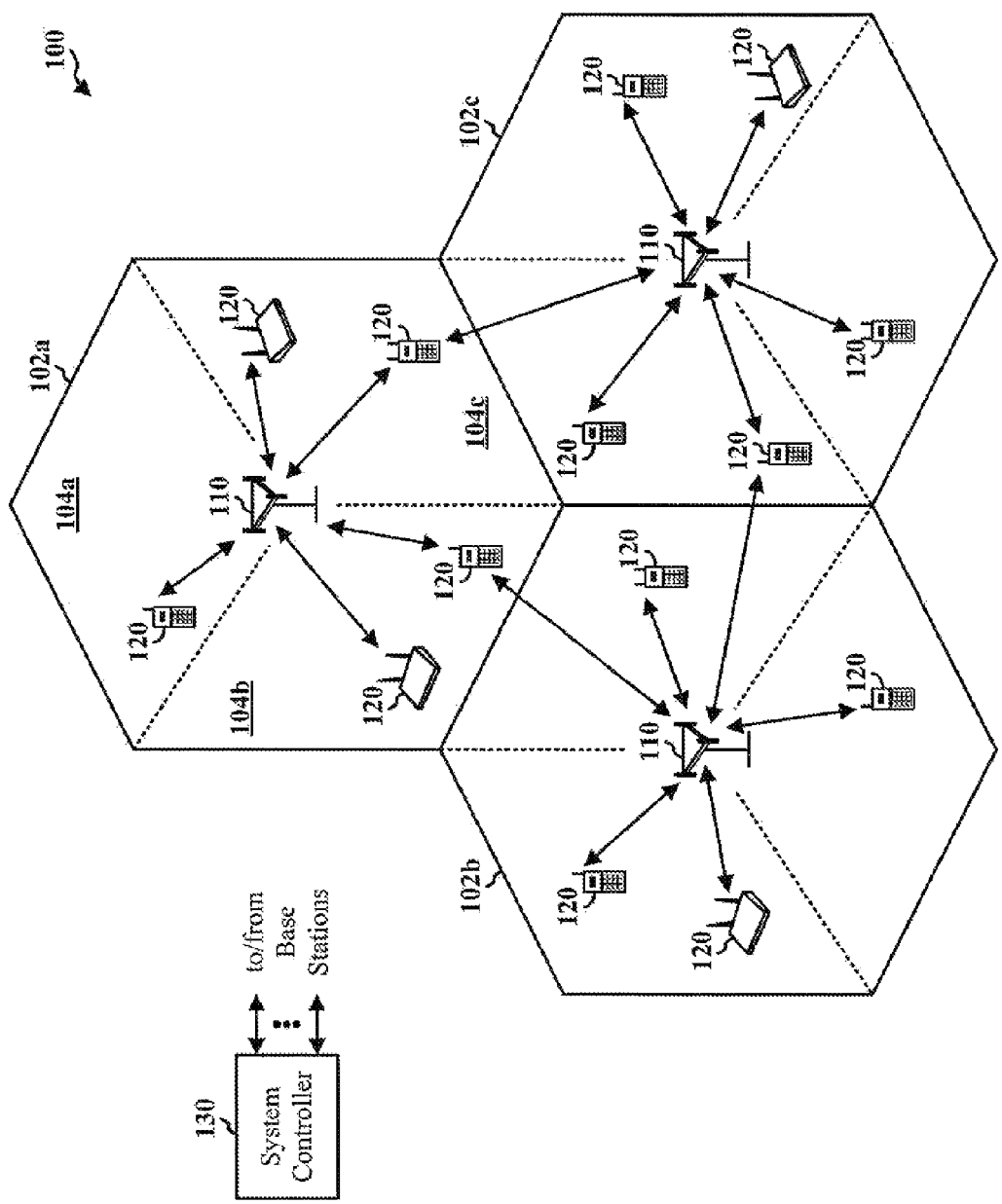
FIG. 1 illustrates a wireless communication system with multiple base stations and multiple terminals, in accordance with one or more aspects.

Various embodiments are now described with reference to the drawings wherein like reference numerals are used in refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "system," and the like are intended to refer to a computer-related entity, either hardware, software, software in execution, firmware, middle ware, microcode, and/or any combination thereof. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complimented by additional components in order to facilitate achieving the various aspects, goals, advantages, etc., described with regard thereto, and are not limited to the precise configurations set forth in a given figure, as will be appreciated by one skilled in the art.

Furthermore, various embodiments are described herein in connection with a subscriber station. A subscriber station can also be called a system, a subscriber unit, mobile station, mobile, remote station, access point, remote terminal, access terminal, user terminal, user agent, a user device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. It will be appreciated that the word "exemplary" is used herein to mean "serving as an example, instance, or illustration." Any embodiment or design described herein as "exemplary" is not necessarily to be construed as preferred or advantageous over other embodiments or designs.

FIG. 1 illustrates a wireless communication system 100 with multiple base stations 110 and multiple terminals 120, in accordance with one or more aspects. A base station is generally a fixed station that communicates with the terminals and may also be called an access point, a Node B, or some other terminology. Each base station 110 provides communication coverage for a particular geographic area 102. The term "cell" can refer to a base station and/or its coverage area depending on the context in which the term is used. To improve system capacity, a base station coverage area may be partitioned into multiple smaller areas (e.g., three smaller areas, according to FIG. 1), 104a, 104b, and 104c. Each smaller area can be served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The transmission techniques described herein may be used for a system with sectorized cells as well as a system with un-sectionized cells. For simplicity, in the following description, the term "base station" is used generically for a fixed station that serves a sector as well as a fixed station that serves a cell.

Terminals 120 are typically dispersed throughout the system, and each terminal may be fixed or mobile. A terminal may also be called a mobile station, user equipment, a user device, or some other terminology. A terminal may be a wireless device, a cellular phone, a personal digital assistant (PDA), a wireless modem card, and so on. Each terminal 120 may communicate with zero, one, or multiple base stations on the downlink and uplink at any given moment. The downlink (or forward link) refers to the communication link from the base stations to the terminals, and the uplink (or reverse link) refers to the communication link from the terminals to the base stations.

For a centralized architecture, a system controller 130 couples to base stations 110 and provides coordination and control for base stations 110. For a distributed architecture, base stations 110 may communicate with one another as needed. Data transmission on the forward link occurs from one access point to one access terminal at or near the maximum data rate that can be supported by the forward link and/or the communication system. Additional channels of the forward link (e.g., control channel) may be transmitted from multiple access points one access terminal. Reverse link data communication may occur from one access terminal to one or more access points.

After registration, which allows an access terminal to access an access network, access terminal 120 and one of the access points, such as access point 110, establish a communication link using a predetermined access procedure. In the connected state resulting from the predetermined access procedure, access terminal 120 can receive data and control messages from access point 100 and is able to transmit data and control messages to access point 100. Access terminal 120 continually searches for other access points that may be added to an active set of access terminal 120. An active set comprises a list of access points capable of communicating with access terminal 120. When such an access point is found, access terminal 120 can calculate a quality metric of the access point's forward link, which may comprise a signal-to-interference and- noise ratio (SINR). An SINR may be determined in accordance with a pilot signal Access terminal 120 searches for other access points and determines SINRs for respective access points. Concurrently, access terminal 120 calculates a quality metric of a forward link for each access point in the active set of access terminal 120. If the forward link quality metric from a particular access point is above a predetermined add threshold or below a predetermined drop threshold for a predetermined period of time, access terminal 120 can report such information to access point 110. Subsequent messages from access point 110 may direct access terminal 120 to add to or to delete from the access terminal 120 active set the particular access point.

Access terminal 120 can additionally select a serving access point from the access terminal's 120 active set based on a set of parameters. A serving access point is an access point that is selected for data communication by a particular access terminal or an access point that is communicating data to the particular access terminal. The set of parameters may comprise any one or more of present and previous SINR measurements, a bit-error-rate, a packet-error-rate, for example, and any other known or desired parameters. Thus, for example, the serving access point may be selected in accordance with the largest SINR measurement. Access terminal 120 can then broadcast a data request message (DRC message) or a data request channel (DRC channel). The DRC message can contain a requested data rate or, alternatively, an indication of a quality of the forward link (e.g., measured SINR, a bit-error-rate, a packet-error-rate, . . . ) and the like. Access terminal 120 may direct the broadcast of the DRC message to a specific access point by the use of a code, which uniquely identifies the specific access point.

The data to be transmitted to access terminal 120 can be received by access network controller 130. Thereafter, access network controller 130 may send the data to all access points in the access terminal 120 active set. Alternatively, access network controller 130 may first determine which access point was selected by the access terminal 120 as the serving access point, and then send the data to the serving access point. The data can be stored in a queue at the access point(s). A paging message may then be sent by one or more access points to access terminal 120 on respective control channels. Access terminal 120 demodulates and decodes the signals on one or more control channels to obtain the paging messages.

Figure 2:
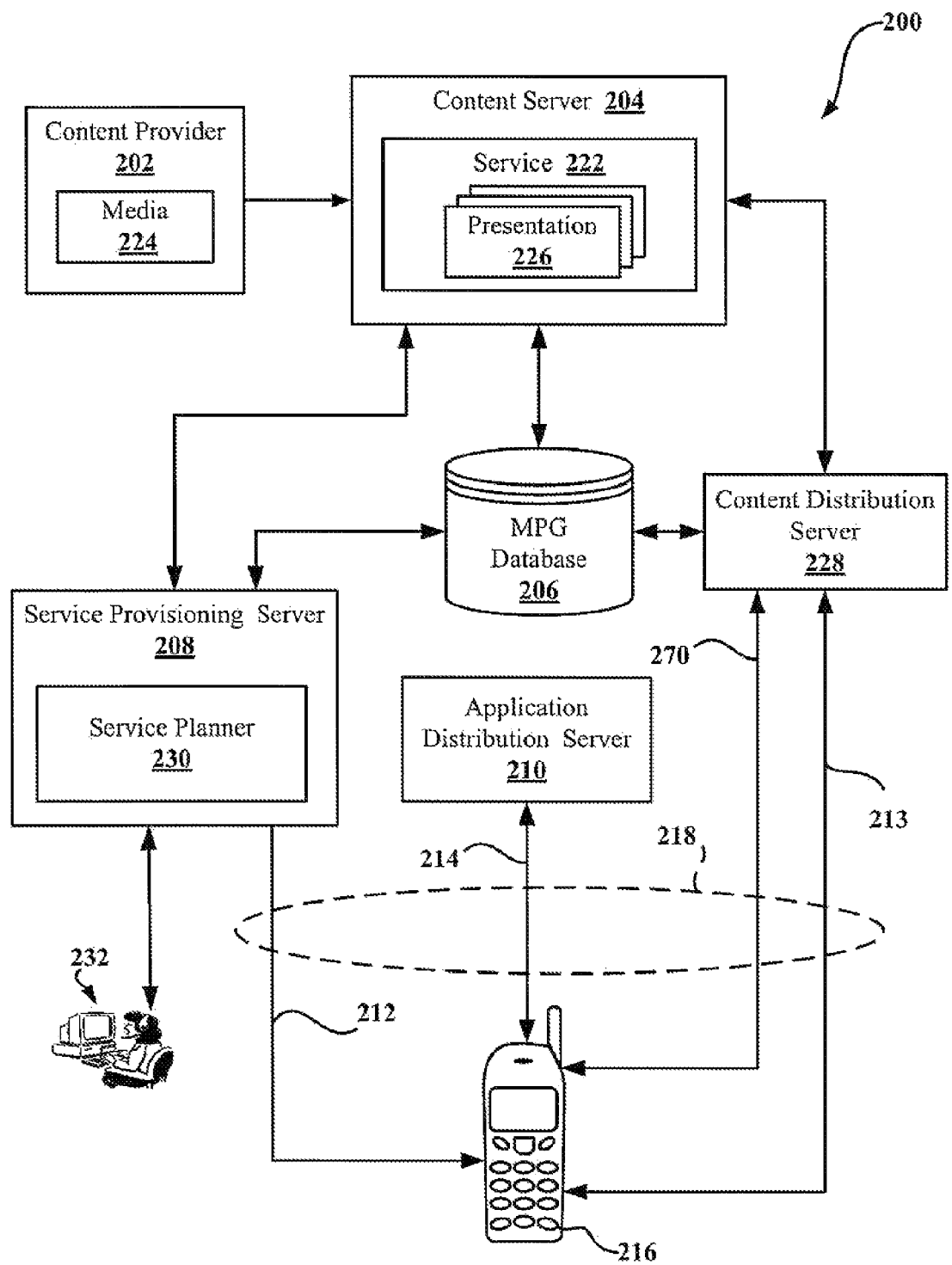
FIG. 2 illustrates a media distribution system ("MDS") for downloading a service to at least one wireless device, in accordance with various aspects.

FIG. 2 illustrates a media distribution system ("MDS") 200 for downloading a service 222 to at least one wireless device 216, and comprises a content provider 202, a content server 204, a content distribution server 228, a service provisioning server 208, a database 206, and an application distribution server 210. Content provider 202 operates to provide the content for distribution to users in the network 218 through content server 204 and content distribution server 228. The content comprises media 224, such as video, audio, multimedia content, clips, scripts, programs, data and any other suitable content. Media 224 may comprise real-time content, non-real-time content, and/or a combination of the two. Media 224, either individually or in combination, may from a presentation 226 that may be viewed or otherwise output on a device.

Content server 204 operates to provide content distribution server 228 with presentations 226 associated with a service 222. Service 222 comprises a sequence of presentations 226 offered under a single label, or identifier. Each presentation 226 may comprise real-time content, non-real-time content, and mixed combinations of real- and non-real-time content. Furthermore, each service 222 may provide real-time presentations, non-real-time presentations, and both real-time and non-real-time presentations. For example, a real-time presentation may be a live broadcast of a sporting event. Further, for example, a non-real-time presentation may be an advertisement. Additionally, a combined presentation may include, for example, links to player information in combination with a live broadcast of a sporting event.

Database 206 may comprise records that define a media presentation guide ("MPG") providing a broadcast schedule, or a time at which device 216 may present presentations 226 to a user and a time at which device 216 may retrieve non-real-time content. In one non-limiting aspect, the MPG may be transmitted to a device 216 at the time of service activation, although it may be broadcast or otherwise transmitted at any time. Although database 206 is described as a data repository, it should be noted that any interface could be used that provides the media presentation guide information to the other components of system 200.

Device-server interfaces 212, 213, and 214 are operable to interface device 216 with MDS 200 server components. Interfaces 212, 213, and 214 may be physical connections and/or a wireless connections using air interface techniques such as code division multiple access ("CDMA"), wideband code division multiple access ("WCDMA"), universal mobile telecommunications system ("UMTS"), advanced mobile phone service ("AMPS"), time division multiple access ("TDMA"), frequency division multiple access ("FDMA"), orthogonal frequency division multiple access ("OFDMA"), global system for mobile communications ("GSM"), single carrier ("IX") radio transmission technology ("RTT"), evolution data only ("EV-DO") technology, general packet radio service ("GPRS"), enhanced data GSM environment ("EDGE"), high speed downlink data packet access ("HSPDA"), analog and digital satellite systems, and any other technologies/protocols that may be used in at least one of a wireless communications network and a data communications network. Interface 212 provides service activation and subscription information from service provisioning server 208; interface 213 provides MPG and content delivery from the content distribution server 228; and interface 214 provides application download capability between device 216 and application distribution server 210.

Additionally, it should be noted that servers 206, 208, 210 and 228, which define a portion of media distribution system 200, may be combined into a single server and/or may each be a combinations of one or more servers. Further, these servers may be located together and/or remotely from one another. Additionally, servers 206, 208, 210 and 228 may communicate via a physical connection and/or via a wireless connection using the air interface techniques discussed above.

Figure 3:
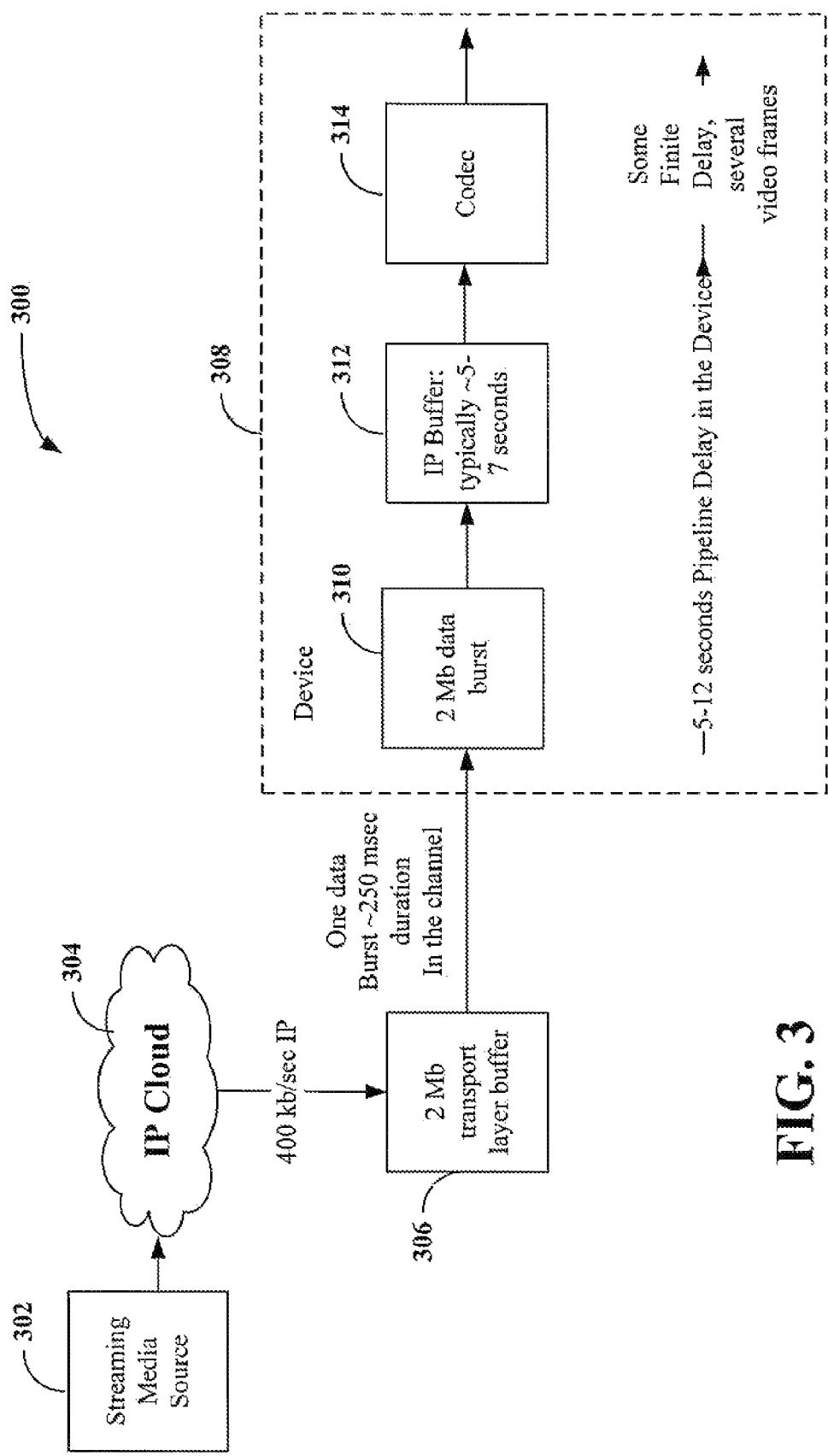
FIG. 3 is an illustration of a conventional digital video broadcast-handheld (DVB-H) communication model, in accordance with one or more aspects described herein.

FIG. 3 illustrates a conventional digital video broadcast-handheld (DVB-H) communication model 300, in accordance with one or more aspects described herein. Model 300 comprises a streaming media source 302 that provides streaming media (e.g., video, audio, etc.) to an IP "cloud" 304, which represents one or more Internet protocol operations. Streaming media that has traversed IP cloud 304 can be received by a 2 Mb transport layer buffer 306, for instance, over a connection that provides 400 kb/second. At this rate, transport layer buffer will fill every 5 seconds, at which point it can be transmitted to a user device 308. Transmission can be performed using a data burst of approximately 250 ms duration in the transmission channel using a DVB-H physical layer at approximately 1 bps/Hz, 8 MHz.

User device 308 can receive the 2 Mb burst 310 once every 4 seconds, where the burst typically has a duration of about 250 ms, and can run an MPE-FEC protocol thereon. The conventional user device 308 comprises an IP buffer 312 that dejitters the received IP packets, sorts the packets out of order, and unwraps the IP. Such buffering, when performed in the user device 308 (e.g., a handset, . . . ) causes a delay of approximately 5-7 seconds. User device 308 further comprises a codec 314 that decodes the received streaming media, which can result in further delay (e.g., on the order of several frames, . . . ). Thus, the conventional model 300, by placing the IP buffer in the handset, causes an aggregate acquisition time delay on the order of about 5 to 12 seconds.

There are several drawbacks to the conventional model 300. For instance, the phase of the DVB-H burst relative to channel change is random, and the range of delay associated therewith can be from 0.25 seconds to 5 seconds, with an average of 2.6 seconds. Additionally, the size of the IP buffer 312 is directly correlated to the worst case quality-of-service (QoS) that the IP has transmitted during delivery. Accordingly, device 308 can require a large buffer unless QoS is very tightly specified, which results in the 5- to 7-second delay for a typical Internet streaming channel. Thus, buffering delay in a conventional handset lasts about 5 to 7 seconds and can be even longer depending on the IP QoS, which in turn causes an aggregate channel change delay of approximately 5-12 seconds, exclusive of codec delay. In view of the foregoing, the phy layer of the conventional device 308 achieves only 250 ms of diversity over 5 seconds of channel time.

Figure 4:
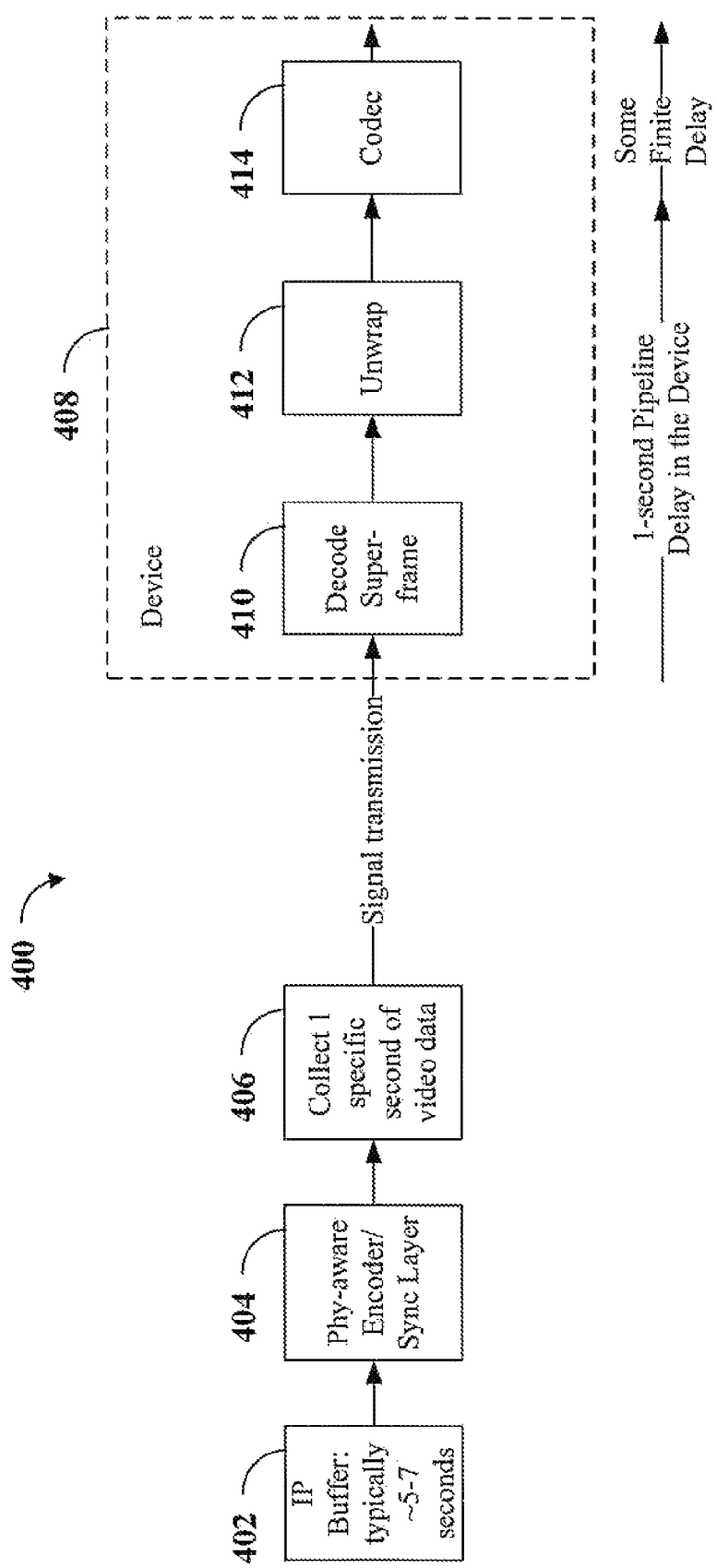
FIG. 4 illustrates a forward-link-only (FLO) communication model wherein an IP buffer is removed from a handheld device and relocated on a transmission side of the model to facilitate reducing acquisition delay and improving communication throughput and quality, in accordance with various aspects described herein.

FIG. 4 illustrates a forward-link-only (FLO) communication model 400 wherein an IP buffer is removed from a handheld device and relocated on a transmission side of the model 400 to facilitate reducing acquisition delay and improving communication throughput and quality, in accordance with various aspects described herein. Model 400, as illustrated, comprises an IP buffer 402 that dejitters IP packets, sorts the packets out of order, and unwraps the IP on a transmission side of mode 400, in a manner substantially similar to that in which IP buffer 312 performs such functions as described with regard to the preceding figure. A phy-aware encoder/sync layer 404 (e.g., an encoder that is aware of the physical layer and/or structure thereof over which streaming media data will be transmitted, etc.) can receive buffered streaming media data and encode the streaming data to generate approximately 1-second-long units of media data. A FLO codec 406, which can be a physical layer that is a combination of a FLO codec and an interleaver buffer that operates in a temporal space totaling approximately 1 second, can collect a specific second-worth of media data. For instance, FLO codec 406 can fill each superframe with an amount of data required for a next or subsequent display second, while omitting unnecessary data that is not required for the specific frame. According to one aspect, a block of data for FLO demodulation of a channel can be a media logical channel, which can be packaged in a superframe. A transmission can then be performed, wherein 1 second of variable-rate date is transmitted each second in four bursts, each spaced from the other by approximately 250 ms. The transmitted second-worth of data comprises data to be displayed in a next or subsequent second on a handheld device 408.

Device 408 can receive a second-worth (e.g., a superframe in the case of a FLO system, a "time slice" in the case of DVB-H, . . . ) of data each second and a decoder 410 can decode the superframe as it is received. An IP unwrapper 412 can unwrap the data, and a codec 414 can decode the streaming media comprised thereby. In this manner, the pipeline delay associated with receiving and decoding the streaming media data can be reduced to approximately 1 second, which can greatly increase throughput from a user perspective and provide the user of device 408 with a more robust communication experience. By removing the IP buffer from a handset device, acquisition time can be reduced by a minimum of approximately 5 seconds. Moreover, in the presence of a protocol such as MPEG2 or the like, the size of the FLO phy layer input buffer can be reduced. Thus, the FLO communication model 400 can achieve time diversity on the order of approximately 750 ms per second.

According to related aspects, I frames can be inserted into the transmitted superframe(s) upon scene changes in the media data. For instance, a pseudo-I frame is the compressed result of the difference between a predicted frame and a source image in a sequence of images at the frame at which acquisition is desired. Thus, video acquisition can be driven to well below a 2-second maximum duration, and corrupted frames can be cleared in 1 second or less. Such aspects facilitate eliminating the IP jitter buffer in a handset device in favor of relocating the buffer to a transmission side of a communication system, mitigating out-of-order delivery, and thereby reduce acquisition time in a manner that cannot be achieved using a DVB-H system.

Figure 5:
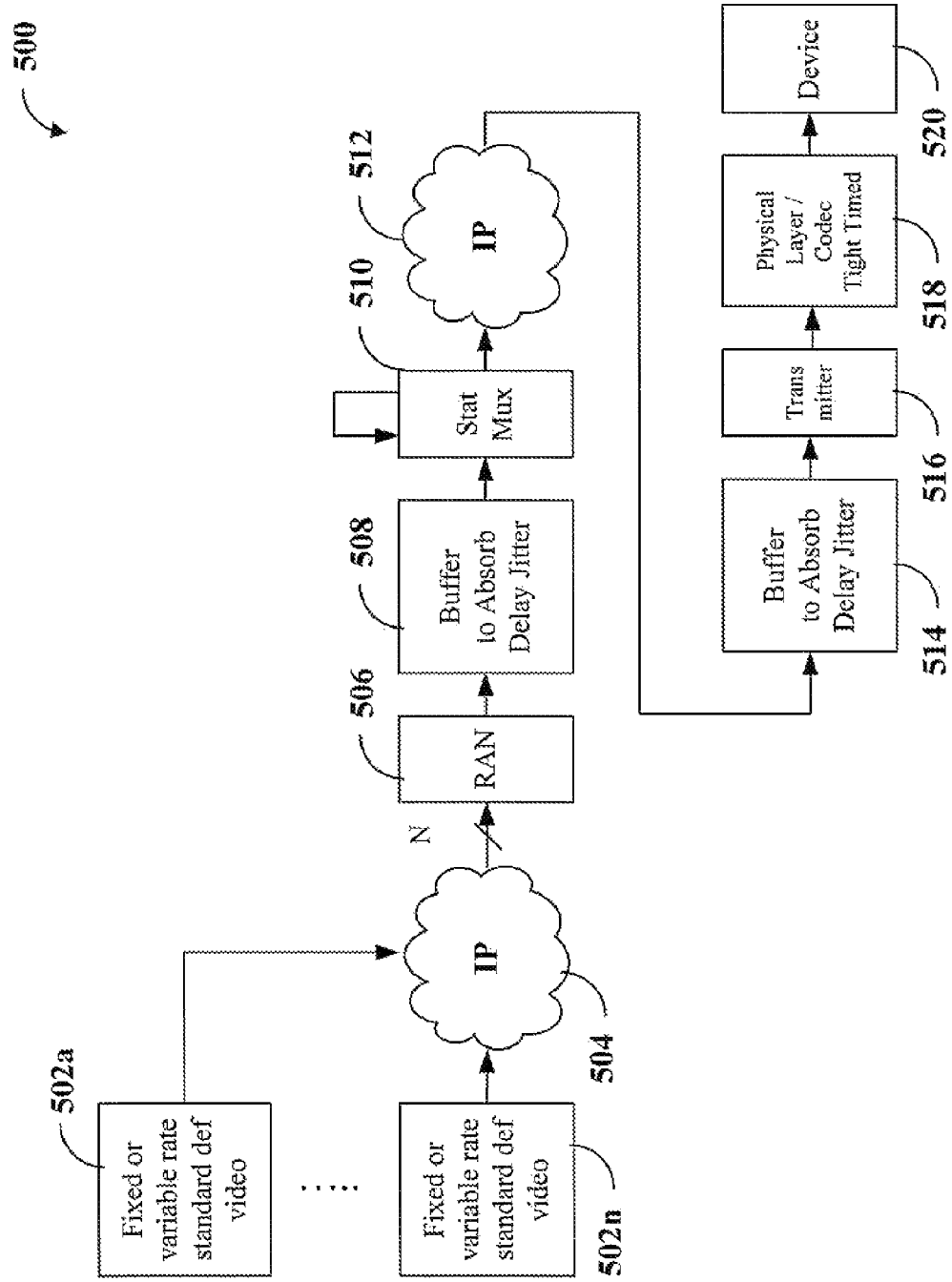
FIG. 5 illustrates a FLO communication model that facilitates reducing acquisition time in accordance with one or more aspects presented herein.

FIG. 5 illustrates a FLO communication model 500 that facilitates reducing acquisition time in accordance with one or more aspects presented herein. Model 500 comprises a plurality of fixed-or-variable rate standard definition video sources 502a-502n, which provide input for an IP contribution link 504 that has tightly defined delay jitter QoS. IP contribution link 504 can then provide buffered data to a radio access network 506. A buffer 508 receives data from the network and buffers to absorb delay jitter before providing the buffered data to a multiplexer 510. Data then traverses an IP distribution link 512 with tightly controlled delay jitter, and such data is again buffered to absorb delay jitter by buffer 512. It can be desirable to provide the IP distribution link with tightly controlled delay jitter because a lack thereof can undesirably increase buffer size, as well as acquisition time. Thus, buffer delay can be mitigated by specifying a tighter QoS. However, QoS restraints can be relaxed (e.g., QoS can be loosened) while retaining the improved acquisition time because an encoder associated with RAN 506 (e.g., such as phy-aware encoder 404) understands the packaging settings of the DVB-H phy, and can therefore fill the IP packets precisely in accordance with the burst size. A transmitter 516 can transmit the buffered data via a physical layer/tightly-timed codec 518 to a user device 520. By integrating the physical layer interleaver delay and the buffer delay, aggregate delay can be reduced by approximately 50%, which in turn results in substantial bit-efficiency improvement.

Figure 6:
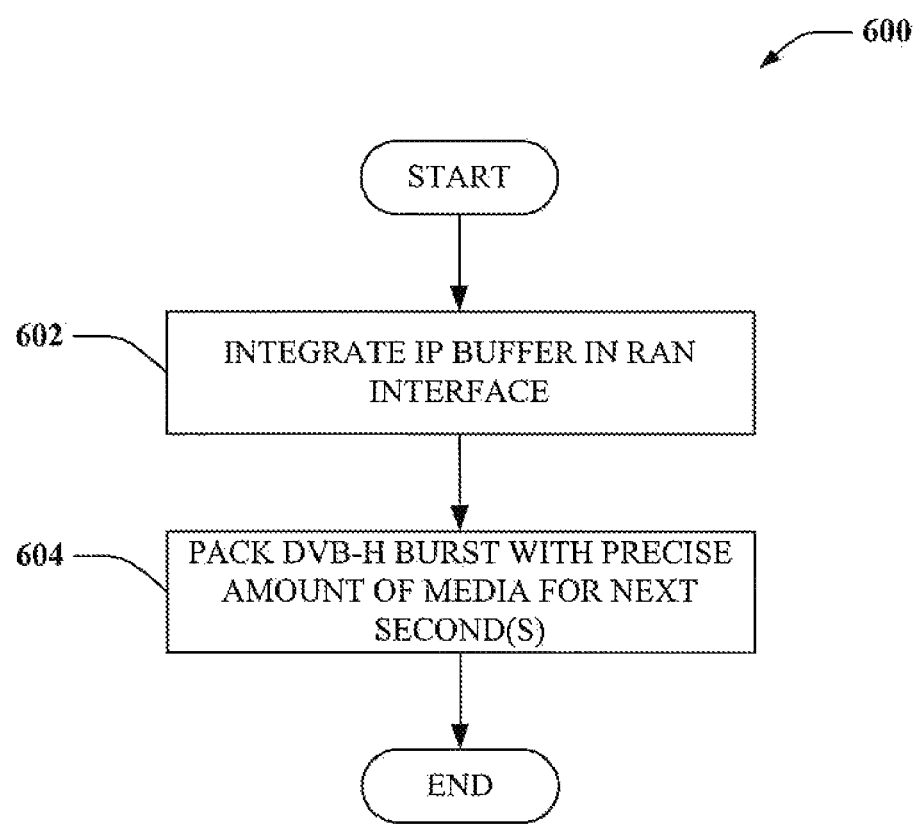
FIG. 6 illustrates a methodology for reducing acquisition time for a DVB-H channel in a wireless communication system, in accordance with one or more aspects.
Figure 7:
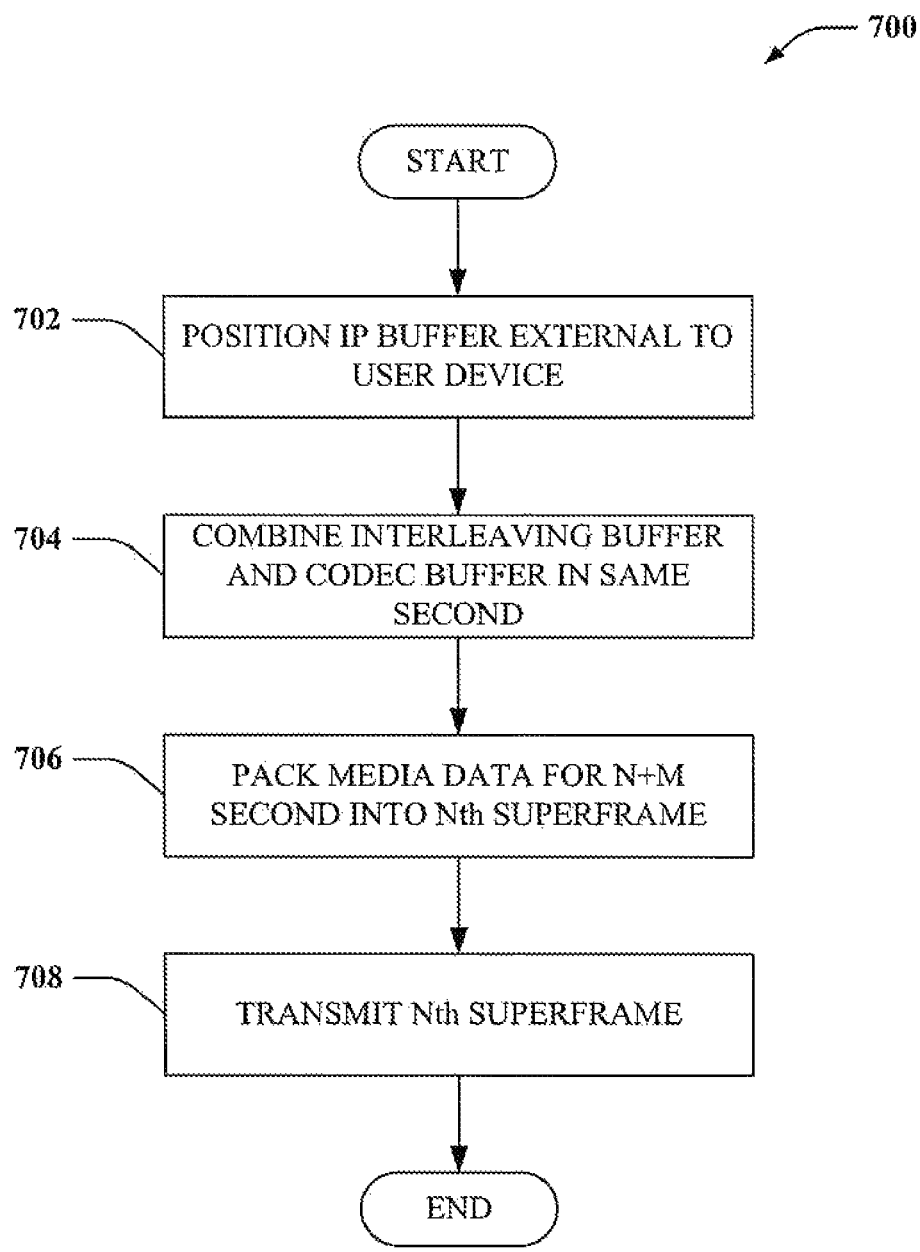
FIG. 7 is an illustration of a methodology for reducing acquisition time for a user device receiving streaming media according to a DVB-H protocol, in accordance with one or more aspects presented herein.
Figure 8:
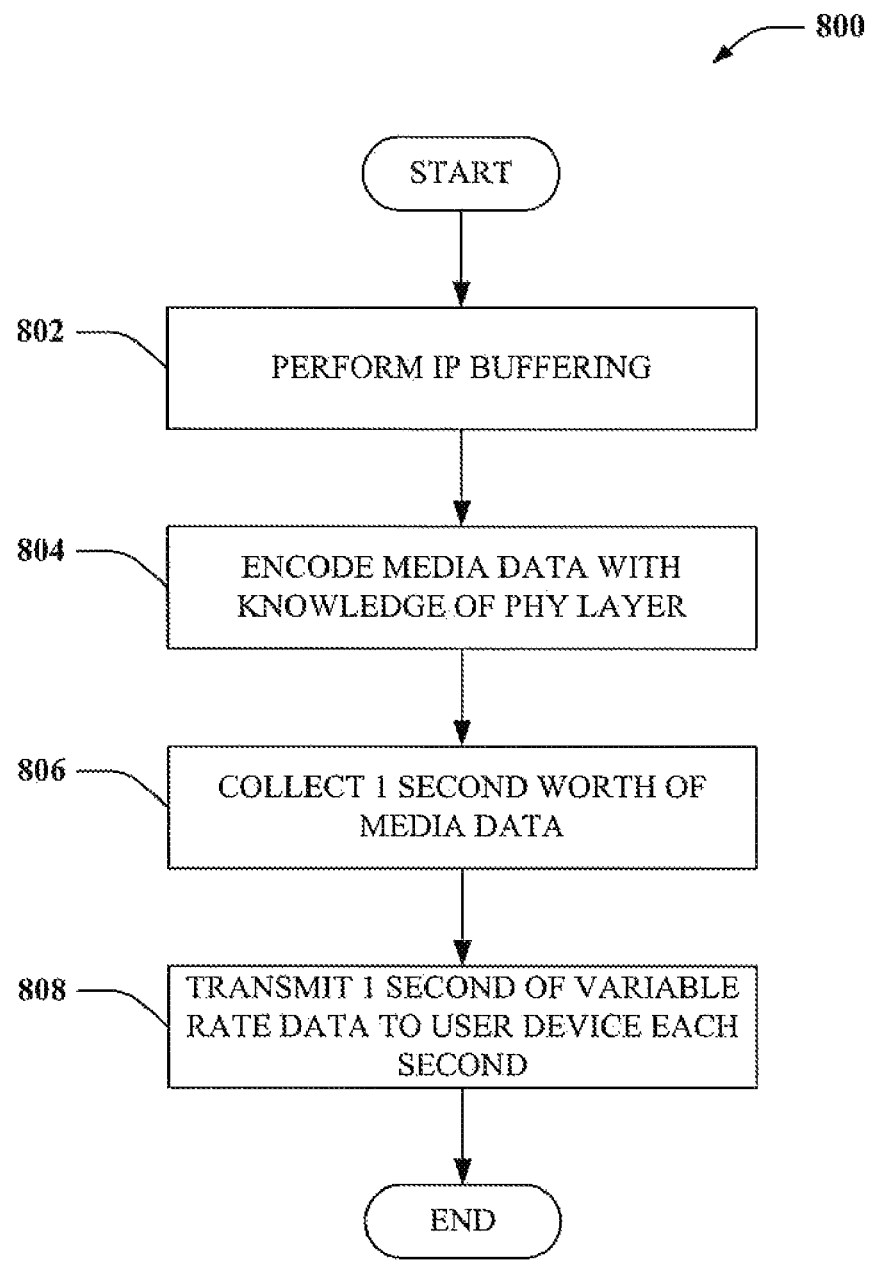
FIG. 8 illustrates a methodology for reducing streaming media acquisition time and improving bit-efficiency using a phy-aware FLO codec, in accordance with one or more aspects.

Referring to FIGS. 6-8 methodologies relating to employing an IP buffer in a transmission side of a communication system and pre-packing streaming media superframes are illustrated. For example, methodologies can relate to employing an IP buffer in a transmission side of a communication system, rather than in a mobile device handset, as is conventional, in an FDMA environment, an OFDMA environment, a CDMA environment, a WCDMA environment, a TDMA environment, an SDMA environment, or any other suitable wireless environment. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

FIG. 6 illustrates a methodology 600 for reducing acquisition time for a DVB-H channel in a wireless communication system, in accordance with one or more aspects. At 602, and IP buffer can be integrated into a radio access network (RAN) interface, in a manner similar to that described with regard to preceding figures. The IP buffer is typically associated with a delay of approximately 5-7 seconds. Conventional systems, such as DVB-H based systems, place the IP buffer layer in the mobile device, and thereby compound buffer delays associated with receiving streaming media. By placing the IP buffer in the RAN interface, buffering can be performed prior to transmission to the user device, which can effect a 5-7 second reduction in acquisition time for the user device. Additionally, placing the IP buffer in the RAN interface permits the fixed burst size of a DVB-H channel to be very precisely packed to contain a correct amount of data for a next superframe. Data selection and/or packing can be performed by an encoder, such as the phy-aware encoder 404 described with regard to FIG. 4.

According to an example, a present superframe N (e.g., of a duration of 1 second) can be packed with media data (e.g., video, audio, . . . ) that is expected to be displayed in a next superframe N+1. Data packaged into superframe N can be positioned even adjacent to the boundaries of superframe end, so long as data and/or packets thereof do not traverse superframe boundaries. To further this example, if a user device expects data for a current second, or superframe, the data will have been packed into the preceding second, even to the boundary of the current second, but data expected for the current second does not cross the boundary into the current second. By pre-packing media data in this manner, the presence of such data can be guaranteed to facilitate smooth streaming media and to mitigate decoding interruptions.

FIG. 7 is an illustration of a methodology 700 for reducing acquisition time for a user device receiving streaming media according to a DVB-H protocol, in accordance with one or more aspects presented herein. At 702, an IP buffer can be employed in a RAN interface, external to the user device, in contrast with DVB-H standards. Removing the IP buffer from the user device side results in a net gain of 5-7 seconds in acquisition delay reduction. At 704, an interleaving buffer and a codec buffer can be combined in the same second, or superframe, into a FLO physical layer that parses streaming media data into 1-second segments. At 706, a specific segment of media data can be collected and packaged into a superframe. Such can be achieved using a phy-aware codec as described with regard to preceding figures, which has knowledge of specific packaging protocols and burst size limits associated with DVB-H transmission protocols. For example, the current superframe N can be packed with data related to a subsequent display second N+M, where N and M are integers. According to an aspect, M can be 1, although M is not limited to being 1. At 708, the Nth superframe of data can be transmitted to a user device. Because the Nth superframe comprises data for the N+Mth display second, the user device will have such data present when the N+Mth second arrives, and can decode such data for display without laboriously performing the IP dejittering buffers associated with conventional DVB-H protocols.

FIG. 8 illustrates a methodology 800 for reducing steaming media acquisition time and improving bit-efficiency using a phy-aware FLO codec, in accordance with one or more aspects. At 802 IP buffering can be performed in a transmission chain in a wireless communication system for transmission of streaming media over a forward link. By performing IP buffering protocols prior to transmission of streaming media, such tasks can be removed from a decoding procedure at a receiving user device, thus saving substantial time during acquisition. At 804, media data can be encoded in view of constraints on the physical transmission layer. For example, because each transmission superframe has a duration of approximately one second, media can be encoded in 1-second segments. At 806, media data can be collected to fill a superframe for transmission. For example, at 806, 1 second worth of media data related to a subsequent display second (e.g., second N+M, where N and M are integers) can be pre-packaged into a current superframe, N. Prepackaging display data facilitates ensuring that data for display at a specific temporal point is present at a receiving user device in advance of its actual display time to a user. The superframe can be transmitted at 808 to a user device as a series of 4 bursts, transmitted approximately 250 ms apart to facilitate transmitting 1 second worth of data every second. As stated above, such a transmission scheme facilitates achieving 750 ms of time diversity per second, in contrast to the 250 ms of time diversity per 5 second that is typical of convention DVB-H transmission systems.

It will be appreciated that, in accordance with one or more aspects described herein, inferences can be made regarding IP dejitter buffering in a RAN interface, prepackaging of streaming media data, lookup tables related thereto, etc. As used herein, the term to "infer" or "inference" refers generally to the process of reasoning about or inferring states of the system, environment, and/or user from a set of observations as captured via events and/or data. Interference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or methods presented above can include making inferences regarding an appropriate lag time between transmission of a superframe and an expected display second associated with the superframe. For instance. If the superframe is designated as N, where N is an integer, then the lag time in seconds can be defined by M, where M is also an integer. M may be 1, such that each superframe comprises media data expected to be displayed in an immediately subsequent second. However, inferences may be made regarding whether or not to increase M in order to preload the user device with several subsequent display seconds of data. Such inferences can be based on, for instance, an indication from the user device that the user device is experiencing an intermittent signal, such as can occur when a user device is traveling at high speeds or the like. Additionally or alternatively, inferences can similarly be made regarding whether to decrease a value of M in order to mitigate a number of superframes waiting to be decoded at the user device. It will be appreciated that the foregoing example is illustrative in nature and is not intended to limit the number of inferences that can be made or the manner in which such inferences are made in conjunction with the various embodiments and/or methods described herein.

Figure 9:
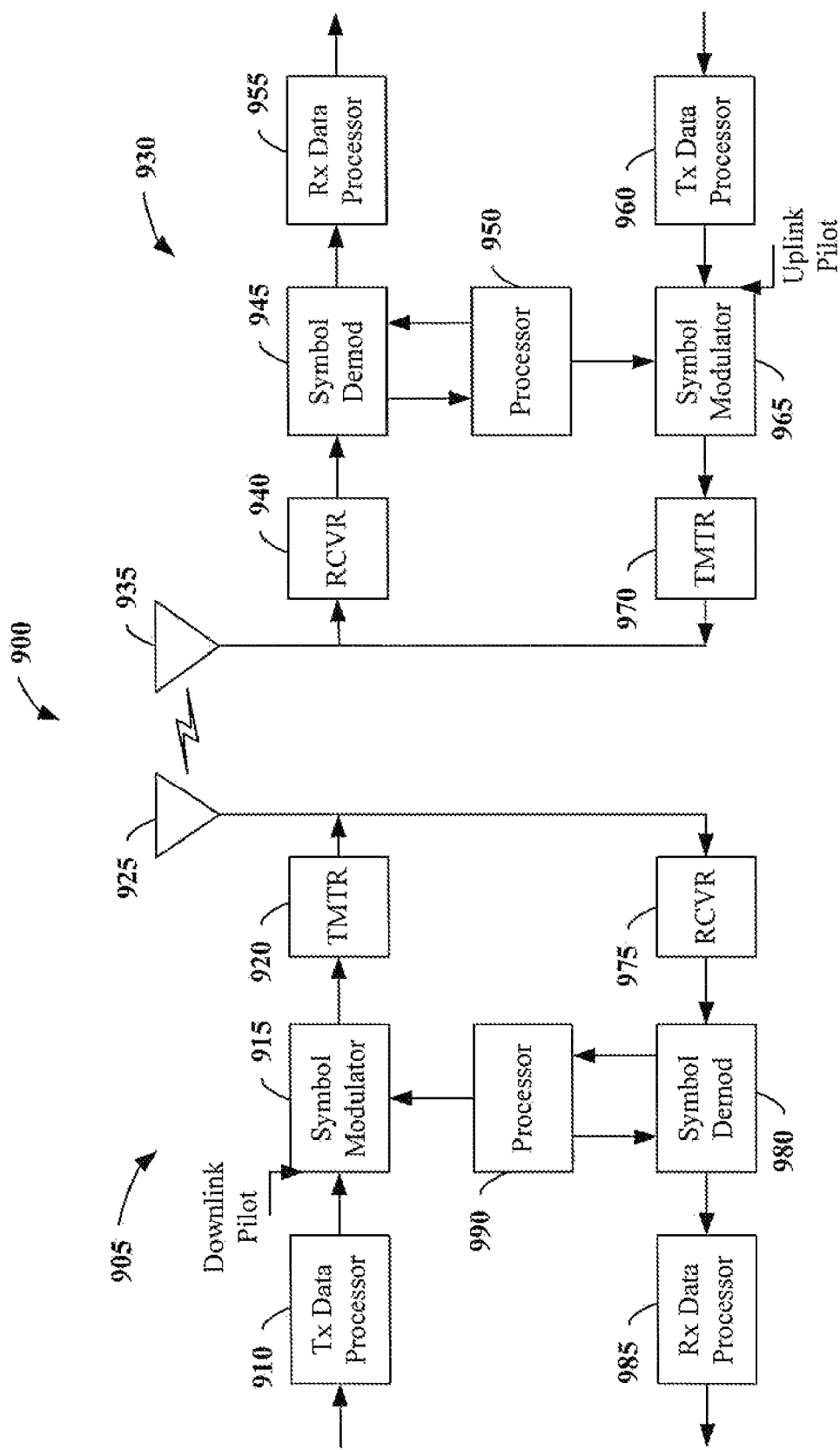
FIG. 9 is an illustration of a wireless network environment that can be employed in conjunction with the various systems and methods described herein.

FIG. 9 shows an exemplary wireless communication system 900. The wireless communication system 900 depicts one base station and one terminal for sake of brevity. However, it is to be appreciated that the system can include more than one base station and/or more than one terminal, wherein additional base stations and/or terminals can be substantially similar or different for the exemplary base station and terminal described below. In addition, it is to be appreciated that the base station and/or the terminal can employ the systems (FIGS. 1-5) and/or methods (FIGS. 6-8) described herein to facilitate wireless communication there between.

Referring now to FIG. 9, on a downlink, at access point 905, a transmit (TX) data processor 910 receives, formats, codes, interleaves, and modulates (or symbol maps) traffic data and provides modulation symbols ("data symbols"). A symbol modulator 915 receives and processes the data symbols and pilot symbols and provides a stream of symbols. A symbol modulator 920 multiplexes data and pilot symbols and provides them to a transmitter unit (TMTR) 920. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or cxode division multiplexed (CDM).

TMTR 920 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 925 to the terminals. At terminal 930, an antenna 935 receives the downlink signal and provides a received signal to a receiver unit (RCVR) 940. Receiver unit 940 conditions (e.g., filters, amplifies, and frequency downconverts) the received signal and digitizes the conditioned signal to obtain samples. A symbol demodulator 945 demodulates and provides received pilot symbols to a processor 950 for channel estimation. Symbol demodulator 945 further receives a frequency response estimate for the downlink from process 950, performs data demodulation on the received data symbols to obtain data symbol estimates (which are estimates of the transmitted data symbols), and provides the data symbol estimates to an RX data processor 955, which demodulates (i.e., symbol demaps), deinterleaves, and decodes the data symbol estimates to recover the transmitted traffic data. The processing by symbol demodulator 945 and RX data processor 955 is complementary to the processing by symbol modulator 915 and TX data processor 910, respectively, at access point 905.

On the uplink a TX data processor 960 processes traffic data and provides data symbols. A symbol modulator 965 receives and multiplexes the data symbols with pilot symbols, performs modulation, and provides a stream of symbols. A transmitter unit 970 then receives and processes the stream of symbols to generate an uplink signal, which is transmitted by the antenna 935 to the access point 905.

At access point 905, the uplink signal from terminal 930 is received by the antenna 925 and processed by a receiver unit 975 to obtain samples. A symbol demodulator 980 then processes the samples and provides received pilot symbols and data symbol estimates for the uplink. An RX data processor 985 processes the data symbol estimates to recover the traffic data transmitted by terminal 930. A processor 990 performs channel estimation for each active terminal transmitting on the uplink. Multiple terminals may transmit pilot concurrently on the uplink on their respective assigned sets of pilot subbands, where the pilot subband sets may be interlaced.

Processors 990 and 950 direct (e.g., control, coordinate, manage, etc.) operation at access point 905 and terminal 930, respectively. Respective processors 990 and 950 can be associated with memory units (not shown) that store program codes and data. Processors 990 and 950 can also perform computations to derive frequency and impulse response estimates for the uplink and downlink, respectively.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 990 and 950.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of reducing acquisition time for streaming media in a transmission side of a wireless communication environment, comprising:
employing an IP buffer in a radio access network (RAN) interface between a RAN and a user device to buffer received IP packets of streaming media data of the streaming media prior to transmitting the IP packets to the user device on a downlink, wherein the IP buffer is disposed on a RAN transmission side of the downlink and dejitters and unwraps the received IP packets; and
encoding the IP packets buffered by the IP buffer utilizing a phy-aware encoder which is aware of a physical layer, and a structure thereof, used with respect to the RAN interface over which the streaming media will be transmitted to employ a variable data rate and a fixed or variable delivery time within a specified time window to form the IP packets to fill a burst size allocated by the physical layer to contain a correct amount of media data for a next superframe and provide the user device with the media data for display without the user device performing IP dejittering buffering and to reduce acquisition time for streaming media in the transmission side of the wireless communication environment.

2. The method of claim 1, further comprising pre-packing a first frame with a predefined amount of media data intended for display at a subsequent fixed or predefined delivery time, wherein a first duration of a first display period of the media data prepacked into the first frame is different than a second duration of a second display period of media data of one of the received IP packets.

3. The method of claim 2, wherein the fixed delivery time is one second.

4. The method of claim 2, further comprising transmitting one display second of buffered streaming media data per second in bursts approximately 250 ms apart.

5. The method of claim 2, further comprising transmitting one display second of buffered streaming media data per second in bursts that are spaced apart by a period of approximately 100 ms to 400 ms.

6. The method of claim 5, wherein the bursts are of uniform duration.

7. The method of claim 5, wherein the bursts have a variable duration.

8. The method of claim 1, further comprising encoding the IP packets according to predefined transmission constraints.

9. The method of claim 1, further comprising transmitting the buffered streaming media data using a DVB-H protocol.

10. The method of claim 1, further comprising collecting approximately one second-worth of data.

11. The method of claim 10, further comprising transmitting the approximately one second-worth of output data at a variable rate approximately each second of system time.

12. The method of claim 11, wherein each transmitted second-worth of data comprises data to be initiated prior to complete delivery of the second-worth of data.

13. The method of claim 12, further comprising permitting decoding of the second-worth of data to be initiated prior to complete delivery of the second-worth of data.

14. The method of claim 12, further comprising completing delivery of the second-worth of data prior to permitting decoding.

15. The method of claim 1, wherein the IP buffer sorts the IP packets out of order.

16. The method of claim 15, wherein the IP buffer unwraps the IP packets by removing information associated with at least one layer from the IP packets.

17. An apparatus for facilitating reducing acquisition delay in a wireless communication environment, comprising:
an IP buffer, in a radio access network (RAN) interface between a RAN and a user device, operable to buffer IP packets from streaming media data prior to transmission to a the user device, wherein the IP buffer is operable to dejitter IP packets; and
a phy-aware encoder operable to have knowledge of package settings related to a DVB-H physical layer and use the knowledge of package settings related to the DVB-H physical layer to pre-package time slices with data from the IP packets buffered by the IP buffer to contain a correct amount of data for display during a subsequent time period by the user device without the user device performing IP dejittering buffering and to reduce acquisition delay in the wireless communication environment.

18. The apparatus of claim 17, the phy-aware encoder is operable to fill an Nth time slice with data intended for an N+Mth display period, where N and M are positive integers.

19. The apparatus of claim 18, wherein the time slice and the display period have a duration of approximately one second.

20. The apparatus of claim 17, further comprising a transmitter operable to transmit a time slice at a fixed time interval in a plurality of temporally equally spaced transmission bursts.

21. The apparatus of claim 20, wherein the fixed time interval is approximately one second.

22. The apparatus of claim 17, wherein the IP buffer is operable to sort the IP packets out of order.

23. The apparatus of claim 22, wherein the IP buffer is operable to unwrap an IP packet by removing information associated with at least one layer from the IP packet.

24. A wireless communication apparatus, comprising:
means for performing interne protocol (IP) buffering of received media data prior to transmitting the buffered media data to a user device, wherein the means for performing the IP buffering is located on a radio access network (RAN) transmission side of a downlink to the user device and is operable to dejitter and unwrap IP packets;
means for encoding buffered media data utilizing a phy-aware encoder with knowledge of a physical layer with which the data is to be transmitted, wherein the buffered media data is encoded using a different packaging protocol than the received media data to form IP packets to fill a burst size allocated by the physical layer to contain a correct amount of media data for display during a subsequent time period by a user device without the user device performing IP dejittering buffering and to reduce acquisition delay in a wireless communication environment in which the wireless communication apparatus is operating; and
means for transmitting the encoded media data.

25. The apparatus of claim 24, wherein the means for transmitting comprises means for transmitting approximately one frame or time slice of data during each of a plurality of fixed intervals.

26. The apparatus of claim 24, wherein the means for transmitting comprises means for transmitting approximately one frame or time slice of data per second.

27. The apparatus of claim 24, wherein the means for transmitting comprises means for transmitting approximately one frame or time slice of data per second at a variable data rate that is equal to or greater than a predefined minimum data rate.

28. The apparatus of claim 24, wherein the means for transmitting comprises means for transmitting approximately one frame of data as a plurality of data bursts, substantially equally spaced in time.

29. The apparatus of claim 24, wherein the means for transmitting comprises means for transmitting approximately one frame of data as a plurality of data bursts that are non-uniformly spaced in time.

30. The apparatus of claim 24, wherein the means for transmitting comprises means for transmitting approximately one frame as 4 data bursts approximately 250 ms apart in time.

31. The apparatus of claim 24, wherein the means for transmitting comprises means for employing a DVB-H protocol.

32. The apparatus of claim 24, wherein the means for encoding comprises means for encoding an Nth frame with data for display during an N+Mth display period, where N and M are positive integers.

33. The apparatus of claim 32, wherein the frame and the display period respectively have a duration of approximately one second.

34. The apparatus of claim 24, wherein the means for performing the IP buffering is operable to sort the IP packets out of order.

35. The apparatus of claim 34, wherein the means for performing the IP buffering is operable to unwrap the IP packets by removing information associated with at least one layer from the IP packets.

36. A non-transitory computer-readable storage medium having stored thereon computer-executable instructions comprising:
buffering data received from a radio access network (RAN) according to an internet protocol (IP) prior to transmitting the buffered data to a user device, wherein an IP buffer providing the buffering is disposed on a RAN transmission side of a downlink to the user device and the buffering comprises dejittering and unwrapping IP packets;
encoding buffered media data utilizing a phy-aware encoder in accordance with constraints associated with a physical layer upon which the data is to be transmitted to form IP packets to fill a burst size allocated by the physical layer to contain a correct amount of media data such that media data is present at a receiving device in advance of a display time of the media data to thereby provide the user device with the data for display without the user device performing IP dejittering buffering and to reduce acquisition delay in a wireless communication environment in which the user device is operating; and
transmitting the encoded media data.

37. The non-transitory computer-readable storage medium of claim 36, wherein the instructions further comprise transmitting approximately one frame of data per second.

38. The non-transitory computer-readable storage medium of claim 36, wherein the instructions further comprise transmitting approximately one frame of data per second at a variable data rate.

39. The non-transitory computer-readable storage medium of claim 36, wherein the instructions further comprise transmitting approximately one frame of data as a plurality of data bursts substantially equally spaced in time.

40. The non-transitory computer-readable storage medium of claim 36, wherein the instructions further comprise transmitting approximately one frame as 4 data bursts approximately 250 ms apart in time.

41. The non-transitory computer-readable storage medium of claim 36, wherein the instructions further comprise utilizing a DVB-H protocol to transmit the data.

42. The non-transitory computer-readable storage medium of claim 36, wherein the instructions further comprise encoding an Nth frame with data for display during an N+Mth display period, where N and M are positive integers.

43. The non-transitory computer-readable storage medium of claim 42, wherein the frame and the display period respectively have a duration of approximately one second.

44. The non-transitory computer-readable storage medium of claim 36, wherein the buffering further comprises sorting the IP packets out of order.

45. The non-transitory computer-readable storage medium of claim 44, wherein the buffering further comprises unwrapping the IP packets by removing information associated with at least one layer from the IP packets.

46. A processor for executing instructions for increasing throughput in a wireless communication environment, the instructions comprising:
pre-buffering received media data received from a radio access network (RAN) according to an interne protocol (IP) prior to transmitting the buffered media data to a user device, wherein an IP buffer providing the pre-buffering is disposed on a RAN transmission side of a downlink to the user device and the pre-buffering comprises dejittering and unwrapping IP packets;
encoding buffered media data utilizing a phy-aware encoder according to pre-defined constraints associated with a physical layer upon which the data is to be transmitted, wherein the buffered media data is encoded with a different transmission protocol than the received media data to form IP packets to fill a burst size allocated by the physical layer to contain a correct amount of media data for display during a subsequent time period by a user device without the user device performing IP dejittering buffering and to reduce acquisition delay in the wireless communication environment; and
transmitting the encoded media data on the physical layer, wherein the processor is hardware.

47. The processor of claim 46, wherein the instructions further comprise transmitting approximately one frame of data per second.

48. The processor of claim 46, wherein the instructions further comprise transmitting approximately one frame of data per second at a variable data rate.

49. The processor of claim 46, wherein the instructions further comprise transmitting approximately one frame of data as a plurality of data bursts, substantially equally spaced in time.

50. The processor of claim 46, wherein the instructions further comprise transmitting approximately one frame as 4 data bursts approximately 250 ms apart in time.

51. The processor of claim 46, wherein the instructions further comprise utilizing a DVB-H protocol to transmit the data.

52. The processor of claim 46, wherein the instructions further comprise encoding an Nth frame with data for display during an N+Mth display period, where N and M are positive integers.

53. The processor of claim 52, wherein the frame and the display period respectively have a duration of approximately one second.

54. The processor of claim 46, wherein the pre-buffering further comprises sorting the IP packets out of order.

55. The processor of claim 54, wherein the pre-buffering further comprises unwrapping the IP packets by removing information associated with at least one layer from the IP packets.

* * * * *